(12) United States Patent
Hascher et al.

(10) Patent No.: US 11,306,930 B2
(45) Date of Patent: Apr. 19, 2022

(54) RIDGE VENT FOR USE ON A ROOF RIDGE

(71) Applicant: Low & Bonar Inc., Candler, NC (US)

(72) Inventors: Lori Hascher, Candler, NC (US); James Mathis, Candler, NC (US); Allan Wingfield, Candler, NC (US)

(73) Assignee: LOW & BONAR INC., Candler, NC (US)

( * ) Notice: Subject to any disclaimer, the term of this patent is extended or adjusted under 35 U.S.C. 154(b) by 543 days.

(21) Appl. No.: 16/000,456

(22) Filed: Jun. 5, 2018

(65) Prior Publication Data

US 2019/0368755 A1 Dec. 5, 2019

(51) Int. Cl.
| | | |
|---|---|---|
| *F24F 7/02* | (2006.01) | |
| *B01D 46/10* | (2006.01) | |
| *B32B 5/02* | (2006.01) | |
| *B32B 5/14* | (2006.01) | |
| *B32B 3/04* | (2006.01) | |

(52) U.S. Cl.
CPC ............... *F24F 7/02* (2013.01); *B01D 46/10* (2013.01); *B01D 2239/069* (2013.01); *B32B 3/04* (2013.01); *B32B 5/022* (2013.01); *B32B 5/14* (2013.01); *B32B 2305/20* (2013.01); *B32B 2307/724* (2013.01); *B32B 2307/726* (2013.01); *B32B 2419/00* (2013.01); *F24F 2221/52* (2013.01)

(58) Field of Classification Search
CPC ............. F24F 7/02; B01D 46/10; B32B 5/022
USPC ........................................................ 454/364
See application file for complete search history.

(56) References Cited

U.S. PATENT DOCUMENTS

| | | | | |
|---|---|---|---|---|
| 2,464,301 | A * | 3/1949 | Francis, Jr. ............ | B01D 39/20 156/277 |
| 6,981,916 | B2 * | 1/2006 | Coulton ................ | E04D 13/176 454/365 |
| 9,005,768 | B2 * | 4/2015 | Mizrahi ................. | B29C 65/02 428/59 |
| 9,200,453 | B2 * | 12/2015 | Kerwood-Winslow ...................... | E04D 13/17 |
| 2013/0165038 | A1 * | 6/2013 | Railkar ................. | E04D 13/176 454/365 |
| 2015/0315794 | A1 * | 11/2015 | Gassman ............... | E04D 13/176 454/365 |

* cited by examiner

*Primary Examiner* — Steven S Anderson, II
*Assistant Examiner* — Phillip Decker
(74) *Attorney, Agent, or Firm* — Oliff PLC

(57) ABSTRACT

A vent having a continuous, elongate mat having an upper face and a lower face, and having a first portion and a second portion. The mat includes a plurality of columns of patterned three-dimensional structures of a network of randomly convoluted polymeric filaments having a first density, at least one of the plurality of columns of patterned three-dimensional structures being provided in the first portion, and at least one other of the plurality of columns of patterned three-dimensional structures being provided in the second portion. The mat includes a throat portion between the first portion and the second portion, the throat portion having a network of randomly convoluted polymeric filaments of a second density different than the first density, a first cover layer covering an outer edge of the first portion, and a second cover layer covering an outer edge of the second portion.

18 Claims, 3 Drawing Sheets

RIDGE VENT FOR USE ON A ROOF RIDGE

BACKGROUND

In buildings, it is often desirable, and also may be a building code requirement, to provide the roof and/or attic area with a means to allow for air exchange. Such a means may allow for a prevention of undue heat buildup, and may enhance the structural integrity of a building.

The instant application relates to a vent. When used on a roof ridge, the vent may allow for a passage of air between the building's interior and the atmosphere, circulation of air in a space between the roof and underlying building structure, and may inhibit water and other undesirable materials from passing through the vent to the building's interior.

The vent of the instant application also allows for a design that conforms to a ridge of a roof, without compromising structural integrity and/or without diminishing air ventilation properties, and the vent still effectively prevents entry of water and other contaminants into undesirable locations in the building. The vent may also have a design to allow for shingles of the roof to be kept from sagging.

SUMMARY

In embodiments, a vent is provided. The vent includes a continuous, elongate mat having an upper face and a lower face, and having a first portion and a second portion. The mat includes a plurality of columns of patterned three-dimensional structures of a network of randomly convoluted polymeric filaments having a first density, at least one of the plurality of columns of patterned three-dimensional structures being provided in the first portion, and at least one other of the plurality of columns of patterned three-dimensional structures being provided in the second portion. The mat further includes a throat portion between the first portion and the second portion, the throat portion having a network of randomly convoluted polymeric filaments of a second density different than the first density, a first cover layer covering an outer edge of the first portion, and a second cover layer covering an outer edge of the second portion.

In embodiments, a method for installing a roof ridge vent is provided. The method includes providing a continuous, elongate mat having an upper face and a lower face, and having a first portion and a second portion, the mat comprising a plurality of columns of patterned three-dimensional structures of a network of randomly convoluted polymeric filaments. The method further includes providing a first cover layer covering an outer edge of the first portion and connecting the first cover layer to the outer edge of the first portion, and providing a second cover layer covering an outer edge of the second portion and connecting the second cover layer to the outer edge of the second portion.

DETAILED DESCRIPTION

In the following description, numerous details are set forth to provide an understanding of the present disclosure. However, it may be understood by those skilled in the art that the methods of the present disclosure may be practiced without these details and that numerous variations or modifications from the described embodiments may be possible.

At the outset, it should be noted that in the development of any such actual embodiment, numerous implementation-specific decisions may be made to achieve the developer's specific goals, such as compliance with system related and business related constraints, which will vary from one implementation to another. Moreover, it will be appreciated that such a development effort might be complex and time consuming but would nevertheless be a routine undertaking for those of ordinary skill in the art having the benefit of this disclosure. In addition, the device and method described herein can also comprise some components other than those cited. In the summary and this detailed description, each numerical value should be read once as modified by the term "about" (unless already expressly so modified), and then read again as not so modified unless otherwise indicated in context. Also, in the summary and this detailed description, it should be understood that a range listed or described as being useful, suitable, or the like, is intended to include support for any conceivable sub-range within the range at least because every point within the range, including the end points, is to be considered as having been stated. For example, "a range of from 1 to 10" is to be read as indicating each possible number along the continuum between about 1 and about 10. Furthermore, the subject matter of this application illustratively disclosed herein suitably may be practiced in the absence of any element(s) that are not specifically disclosed herein.

The following definitions are provided in order to aid those skilled in the art in understanding the detailed description.

As used herein, the term "mat" refers to an elongate, indeterminate-length web of filaments.

As used herein, an "air permeable filter material" is any material that may allow for air to at least partially move from one side of the material, through the material, to another side of the material. The material may or may not be permeable to other things, such as water.

As used herein, a "water barrier" is a material that prevents, or at least significantly impedes, water from penetrating.

As used herein, the term "openwork" may refer to any material having patterns of openings and holes.

As used herein, the term "randomly convoluted" may refer to components that are integrally twisted, folded, or coiled.

As used herein, the term "density" (or "first density" or "second density") as it refers to the polymeric filaments refers to a density of filaments in a certain volume. For example, the density refers to the number of filaments per unit of volume.

Figure 1:
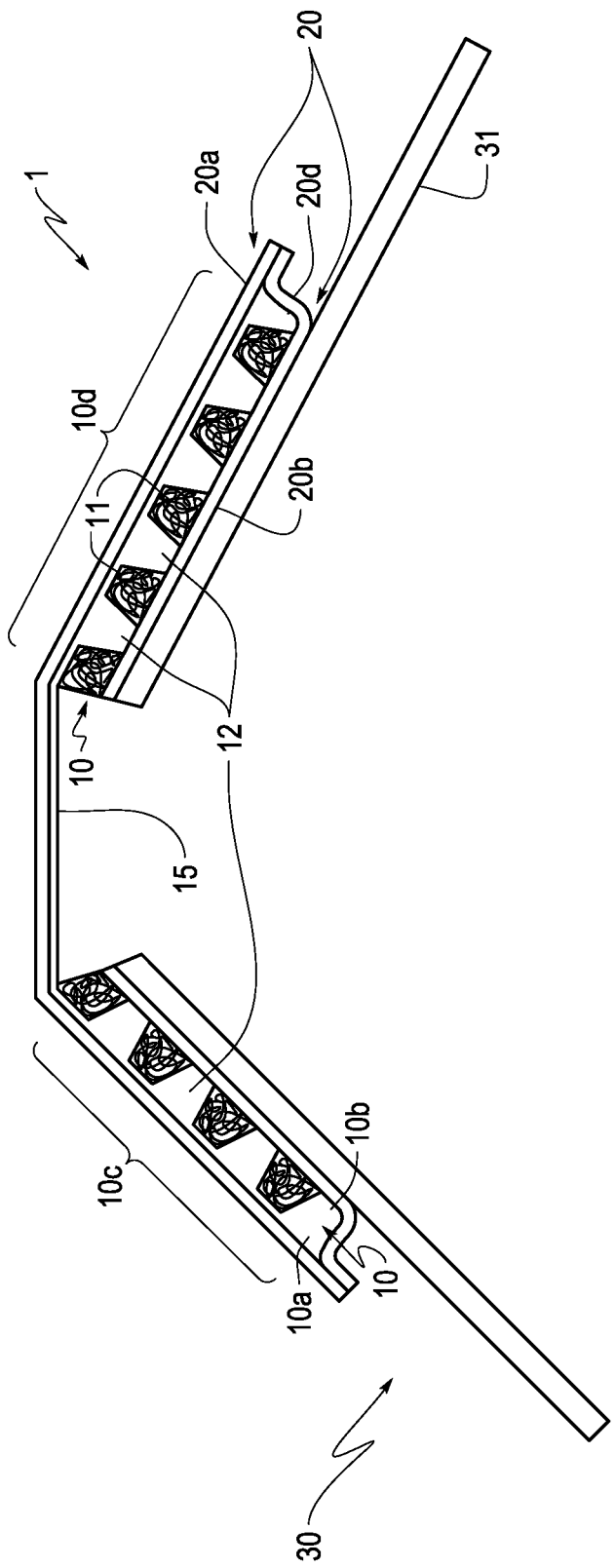
FIG. 1 is a cross-sectional view taken through an elevation of a roof ridge assembly according to an embodiment.

Referring to FIG. 1, a vent 1 is provided. The vent 1 may be adapted to be placed on or near a roof (such as roof 30 in FIG. 1). The vent 1 is referred to as roof ridge vent herein, but the vent 1 may also be adapted to be placed on any other structure where filtration of air or another item is preferred.

The vent 1 may be formed of an elongate, indeterminate-length openwork mat (or web) 10, of randomly convoluted polymeric filaments. The randomly convoluted polymeric filaments comprising mat 10 may be made of any thermoplastic material. In some embodiments, the thermoplastic material is able to withstand temperatures of over 65 to about 100° C. The thermoplastic material may be, for example, a polyester, polyolefin, or nylon. Exemplary materials for the thermoplastic material include polypropylene, nylon 6 (or polyamide 6), polylactic acid, polycaprolactone, polyethylene terephthalate, polybutylene terephthalate, polytrimethylene terephthalate, polyethylene naphthalate, vectran, high density polyethylene, and blends or copolymers thereof. The material may be a monocomponent material, or a bicomponent material, having a core and/or a sheath structure, preferably with a lower melting point sheath material. The material may also be hollow filaments (either monocomponent or bicomponent).

The randomly convoluted polymeric filaments may be intersecting filaments that form a three-dimensional mat. That is, the filaments may intersect each other at one or multiple points along each respective filament and bonded to each other at intersecting points. The filaments may have a diameter of 300 to 1000 microns, or 650 to 750 microns.

A weight of the filaments comprising the mat 10 may be from about 40 to about 100 grams per linear foot, or from about 40 to 60 grams per linear foot, or about 50 grams per linear foot. The weight of the filaments may also be between 10 and 30 ounces per square yard (osy), or between 15 and 25 osy.

The polymer structure of the mat 10 may be formed by extrusion of the thermoplastic material at a temperature above the melting point of the material into or onto a structure or mold having a patterned configuration. Such a three-dimensional structure may include a plurality of three-dimensional structures 11.

Figure 2:
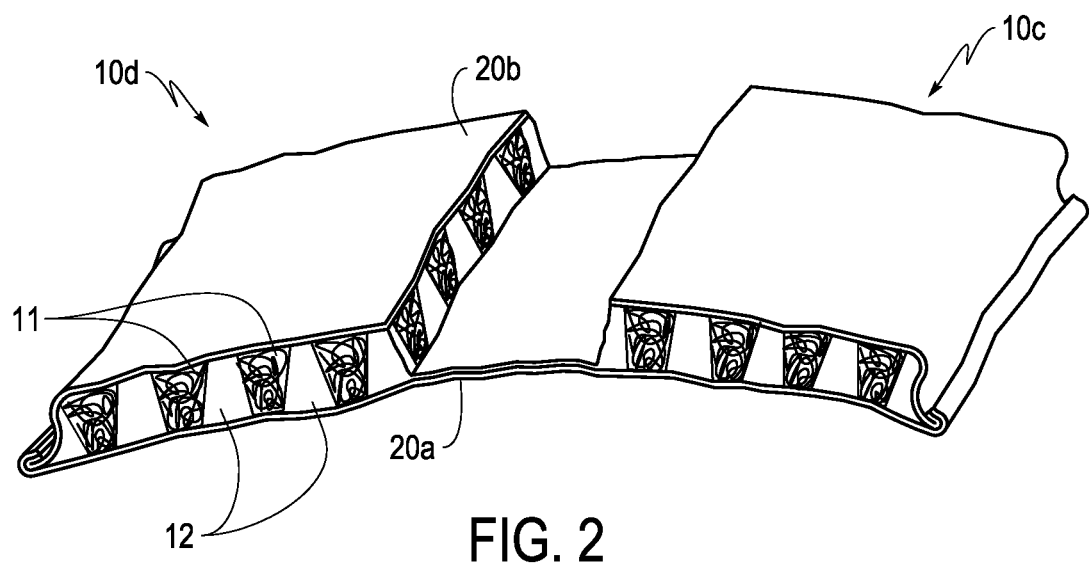
FIG. 2 is a front-back view of the roof ridge vent in a bottom-up orientation according to the embodiment.

For example, the mat 10 may have a patterned configuration of three-dimensional structures 11 including pyramids, cones, cylinders, cubes and the like. In some embodiments, the structures 11 of the mat 10 may comprise a grid-like structure comprised of truncated cones or pyramids. The structures 11 may form a grid-like pattern where each column of structures 11 is spaced from each other along a first axis when viewed top-down or bottom-up. In some embodiments, the three-dimensional structures 11 may be arranged in a plurality of columns with bottoms of the three-dimensional structures 11 spaced from each other as seen from a the bottom-up front view of the vent 1 as seen in FIG. 2.

By way of example, a contemplated process for producing the mat 10 is to utilize a method where continuous molten thermoplastic monofilaments are extruded onto a three-dimensional profiled support structure or into a mold in overlapping rows of irregular loops which are self-bonded or fused at random points of intersection without using any bonding agent or reinforcing inserts. However, bonding agents or inserts may also be used.

The profile of the support provides a negative image of the bottom face 10b of the mat 10. For example, the profile can include the grid-like arrangement of truncated cones so that the face of the mat 10 includes a plurality of hollow pyramidal-shaped recesses, or spaces, 12 having generally flat bases 12a at the apex of the point of truncation of the truncated cones of the support. The shape of these spaces 12 may be readily formed by extruding the filaments, while they are still capable of deformation, onto the negative image of the profile of the support such that the filaments assume the surface shape of the profile and then can harden in that shape.

The patterns of structures 11 and spaces 12 can be particularly made using an extrusion of filaments into a shaped mold and allowed to cool, and a throat 15, discussed in further detail below, may be formed by extruding filaments into a region between portions of the mat 10 having the structures 11, optionally pressing further following extrusion to melt and increase density.

Figure 3:
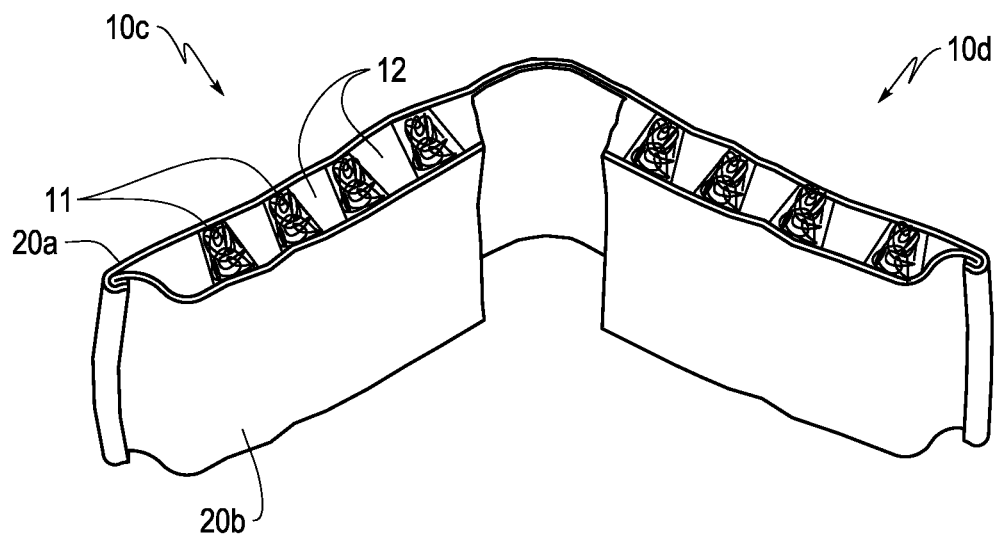
FIG. 3 is a front-back view of the roof ridge vent in a top-down orientation according to the embodiment.

In some embodiments, from a front-back view of the ridge vent 1 oriented in a top-down fashion, as seen in FIG. 3, there are similarly spaces 12 between rows of the structures 11 given the alternating pattern of truncated cones or pyramids. In other embodiments, there may be spaces 12 between columns when viewed in either the top-down or bottom-up direction, but not both. The structures 11 may have a shape and be made of a thickness sufficient so as to allow for a predetermined net-free area to be achieved, and generally improve stability of the ridge vent.

In some embodiments, the structures 11 are provided in a such a manner whereby spaces 12 are provided between adjacent ones of the structures 11. The spaces 12 may be provided to aid in air filtration and ventilation and improve the ventilation for the building having the roof ridge vent 1. The spaces 12 are not necessarily free of filaments, but at least have an area having a reduced number of filaments per unit volume (a lower density, as defined above and as used herein) from those of the structures 11.

In some embodiments, the spaces 12 form open-air spaces of the mat 10. That is, no components are provided, at least at one end, to block the air flow through respective spaces 12. The spaces 12 may be formed in a grid pattern in the mat 10 and open into a lower face 10b but not an upper face 10a of the mat 10. For example, in the cross-sectional view of FIG. 1, the spaces 12 are located where the truncated conical or pyramid structures 11 are illustrated with an amount of filaments in the background that is less dense than surrounding areas.

Figure 4:
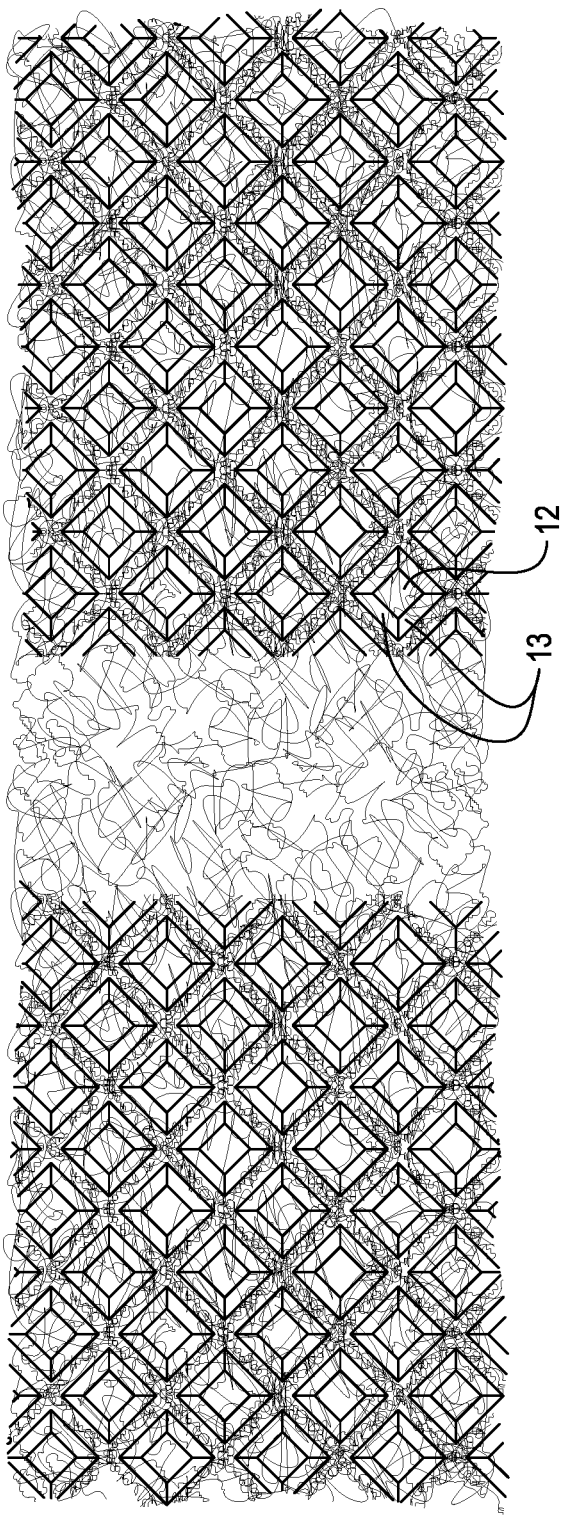
FIG. 4 is a plan view of a length of the underside of a portion of the roof ridge vent according to the embodiment.

Referring to FIG. 4, the spaces 12 are illustrated by the squares within the illustrated grid pattern. The larger square defines the opening of the space via the lower face 10b, and the smaller square is the base 12a of the spaces 12. Walls 13 formed of the randomly convoluted filaments extend from the lower face of the mat 10b to the bases 12a of the spaces 12. The walls 13 may not extend parallel to the side edges of the mat 10, but may instead extend at a transverse angle such as at an angle of about 45° relative to the side edges. This arrangement may thus allow for the convoluted filaments of the mat 10 to prevent unwanted water or other materials from passing through the side edges of the mat 10 and through the body of the mat 10.

In some embodiments, the mat includes a throat, or throat portion 15 provided between the first and second portions 10c, 10d of the mat 10. The throat 15 may also be comprised of a network of randomly convoluted polymeric filaments. The throat 15 may have a density (number of filaments per unit volume) higher than the network of filaments used for the first and second portions 10c, 10d. The higher density may be provided by, for example, extruding a higher volume of filaments into the region having the throat 15 and/or subjecting the throat 15 to more melting of the extruded filaments, for example by heat pressing the throat 15, and/or by confining the extruded filaments into a smaller volume by defining a proper profiled surface/mold (the throat thus having a lower thickness).

The throat 15 may have a smaller thickness, or depth, than a thickness of either of both of the first and second portions 10c, 10d. In some embodiments, the thickness of the throat 15 is relatively small, for example, from between 0.005 inches and 0.2 inches, or about 0.1 inches in thickness. Conversely, the first and second portions 10c, 10d may have a significantly higher thickness, such as from about 0.25 to 2 inches, or about 0.5 inches to about 1 inch, or about 0.625 inches. Further, a width of the throat 15 may measures from about 0.25 to about 1.0 times, or about 0.5 to about 0.6 times, a width of one of the first portion or the second portion 10c, 10d.

Thus, in some embodiments, the throat 15 includes a network of randomly convoluted filaments having a significantly higher density per unit volume than networks of randomly convoluted filaments in other portions of the mat 10, and the throat 15 has a significantly smaller thickness. The throat 15 may be configured to bend so as to allow for mounting of the roof ridge vent 1 along a ridge 31 of a pitched roof 30. Other portions of the mat 10 may be bendable as appropriate, or may be rigidly formed. Air may still pass through the throat 15, but to a lesser extent than through the first and second portions 10c, 10d.

Further, the network of randomly convoluted filaments of the throat 15 may be continuous and comprised of the same filament materials as other portions of the mat 10, and have a structure different from those present in other portions of the mat 10. The throat 15 may have a thickness smaller than that of other portions of the mat 10 and the throat 15 may be formed by pressing and melting filaments in the throat region, so as to be effectively significantly flatter (having a smaller thickness) than that of the first and second portions 10c, 10d.

In some embodiments, material 20 can be included in the vent 1. The material 20 may be in the form of an air-permeable filter, a water barrier, and any combination thereof. The material 20 may be otherwise selectively permeable for water and other compositions and materials, and may be adapted to block unwanted passage of compositions and materials through the structure.

In some embodiments, the material 20 includes an upper portion 20a that is provided along an upper face 10a of the mat 10. The material 20 may also include a lower portion 20b that is provided along the lower face 10b of the mat 10.

The upper portion 20a of the material 20 may extend the entire length of the mat 10, and may contact the mat 10 along an entirety of the mat 10. That is, the upper portion 20a may completely cover the upper face 10a of the mat 10. The upper portion 20a of the mat may be press-fit, bonded either by an adhesive or a melting bond with the filaments, or otherwise adhered to the upper face of the mat 10a, or may also be loosely placed over the upper face of the mat 10a so as to ensure a relationship between the mat 10 and material 20.

Figure 5:
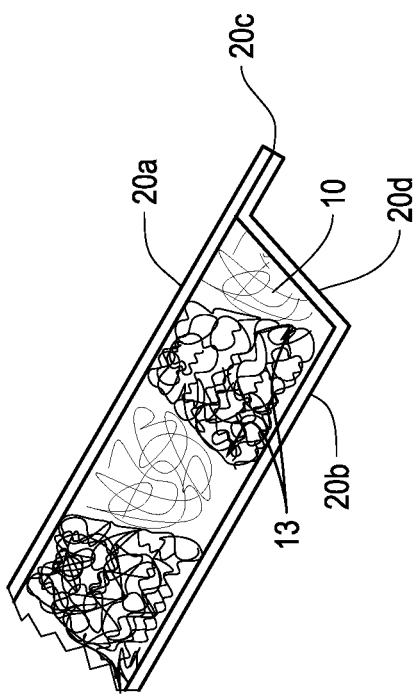
FIG. 5 is a cross-sectional view of a side edge of the roof ridge vent according to the embodiment.

As shown in FIG. 5, the material 20 may be a single strip of material that is folded at its wing 20c which will be at a point slightly beyond the wing of the mat 10, or may be two separate strips of material bonded or otherwise adhered to each other at a point beyond the edge of the mat 10. The wing 20c may extend far enough out from the edge of the structures 11 of the mat so to provide for additional protection to the vent 1.

The lower portion 20b of the material 20 may cover some or all of the columns of structures 12 of the mat 10. The material 20 may cover the upper and lower faces of each of the first and second portions 10c, 10d. Each of the first and second portions 10c, 10d may include one or more of the columns of structures 12. In an exemplary embodiment shown in the instant Figures, each of the first and second portions 10c, 10d includes at least three columns of structures 12. Each of the first and second portions 10c, 10d may have substantially a same thickness. The columns of structures 12 may extend diagonally to the length direction of the mat, or may extend in any other direction as desired. In some embodiments, the material 20 covers the upper face of the throat 15, but not the lower face of the throat 15.

In some embodiments, a portion 20d of the material may be provided along the outer edge of one or both of the first and second portions 10a, 10b of the mat. Providing the portion 20d along the outer edge of the first and/or second portions 10a, 10b of the mat may allow for enhanced protection of the openwork material comprising the mat 10, for example by reducing the likelihood of water runoff to reach unwanted portions of the assembly.

In some embodiments, only material 20d is present, and there lacks any material contacting the upper face 10a or lower face 10b of the mat. In other embodiments, material 20d and 20a, or 20d and 20b, are present, and in still other embodiments, all of 20a, 20b and 20d are present. Further, while 20a and 20b can selectively be either an air-permeable filter or a water barrier or a combination thereof or any covering material, 20a and 20b may not necessarily be made of the same material. It has been conceived, for example, that 20a covering the upper face 10a of the mat would be made of a water barrier, while 20b covering a portion of or all of the lower face 10b of the mat would be made of an air-permeable filter.

The height of the mat 10 may generally be equal to the height of the spaces 12. The height may be, for example, 0.375 inch, 0.5 inch, 0.75 inch, 1 inch, or greater. The upper face 10a of the mat may be subjected to a flattening process while the filaments are still capable of deformation and before the filaments have hardened. This process causes the filaments extending along the upper face 10a to flatten within a common plane and bond together. This may allow for a higher density of filaments at certain portions of the upper face 10a compared to other portions (e.g., along the lower face 10b) of the mat 10. Thus, the upper face 10a can be utilized as a surface that can reliably engage and support fasteners or prevent undesired passage of fastener heads through the face 10a and mat 10.

The width of the mat 10 can be provided at any dimension desired for the ridge vent. That is, the mat 10 may first be provided at an indeterminate length, and cut to size as appropriate. For example, the cut-to-size mat 10 may be 10.5 inches or greater or smaller depending on the length or width of the roof. Similarly, the length of the mat 10 can be provided in any length so as to correspond to the length of a roof. The mat 10 may be rolled (either with or without the material 20 attached thereto) to allow for easier storage and transport. That is, the vent may be provided in roll-form which improves ease of installation and manufacture and reduces expenses.

In some embodiments, the upper portion 20a of the material 20 contacts the upper face of the throat 15, but the lower portion 20b of the filter does not contact the lower face of the throat 15. That is, the material 20 may be designed such that the material 20 covers an entirety of the mat with the exception of the portion of the throat that is included within the lower face 10b of the mat.

In some embodiments, the first and second portions 10c and 10d are identical or substantially identical to each other in depth, length, width and thickness. For example, first portion 10c may be provided on one side of the throat 15, and second portion 10d may be symmetrically provided on the other side of the throat 15. However, that the first and second portions 10c, 10d be entirely symmetrical or of an exact same thickness is not required, so long as each portion includes multiple columns of structures 11 and one portion is disposed on an opposite side of the throat 15 from the other portion.

The vent 1 may be installed within a building structure, and particular with respect to the roof 30, by connecting the material 20 and mat 10, placing the vent 1 over an open slot formed along the ridge 30, and securing the vent 1 to the ridge 30. The securing may occur by any known means, such as bonding or other types of adherence, and is not so limited. Further, the vent may be fastened to the roof ridge 30 along a nail line by means of a plurality of nails, or any other adhering component, the nail line provided along any portion of the ridge vent 1. In some embodiments, the nail line is provided along the material 20 at a portion covering one or both of the first and second portions 10c, 10d of the mat, and a fastening component is provided in a manner to fasten the mat 10 and material 20, to sheathing of the roof ridge 30, and the same or additional fastening components may be used to fasten the mat 10 and material 20 to a shingle cap covering the vent 1. In other embodiments, the nail line is provided along the material 20 at a portion covering the throat 15. The ridge vent 1 may be bent at the throat 15 so as to better conform to the shape of the roof ridge 30. Such flexibility may allow for the roof ridge vent to function properly on a variety of roof types, and the throat section may also serve as a support for a single cap to avoid drooping of the shingle to impede airflow.

Further, although the preceding description has been described herein with reference to particular means, materials and embodiments, it is not intended to be limited to the particulars disclosed herein; rather, it extends to all functionally equivalent structures, methods and uses, such are within the scope of the appended claims.

What is claimed is:

1. A vent, comprising:
    a continuous, elongate mat having an upper face and a lower face, and having a first portion and a second portion, the mat comprising:
        a plurality of columns of patterned three-dimensional structures of a network of randomly convoluted polymeric filaments having a first density, at least one of the plurality of columns of patterned three-dimensional structures being provided in the first portion, and at least one other of the plurality of columns of patterned three-dimensional structures being provided in the second portion;
        a throat portion between the first portion and the second portion, the throat portion having a network of randomly convoluted polymeric filaments, wherein an entirety of the network of randomly convoluted filaments of the throat portion has a density higher than a density of the network of randomly convoluted filaments of each of the first portion and the second portion;
        a first cover layer covering an outer edge of the first portion; and
        a second cover layer covering an outer edge of the second portion.
2. The vent according to claim 1, wherein a first layer of material is provided so as to contact at least a portion of the upper face of the mat.
3. The vent according to claim 2, wherein a second layer of material is provided so as to contact at least a portion of the lower face of the mat.
4. The vent according to claim 3, wherein the first layer of material covers the upper face and the second layer of material covers the lower face of the mat at both the first and second portions.
5. The vent according to claim 1, wherein the first layer of material is an air-permeable filter.
6. The vent according to claim 1, wherein the first layer of material is a water barrier.
7. The vent according to claim 1, wherein the throat portion has a smaller thickness than a thickness of either of the first portion and the second portion.
8. The vent according to claim 1, wherein the throat portion is configured to bend so as to allow for mounting of the vent along a ridge of a pitched roof.
9. The vent according to claim 1, wherein the layer of material contacts the throat portion at the upper face of the throat portion but not at a lower face of the throat portion.
10. The vent according to claim 1, wherein a width of the throat portion measures from about 0.25 to about 1.0 times a width of one of the first portion or the second portion.
11. The vent according to claim 1, wherein each of the first and second portions have substantially a same width.
12. The vent according to claim 1, wherein a thickness of the throat portion is between 0.005 inches and 0.2 inches.
13. The vent according to claim 1, wherein the three-dimensional structures of the mat all have substantially a same thickness.
14. The vent according to claim 1, wherein the randomly convoluted polymeric filaments are intersecting randomly convoluted polymeric filaments.
15. The vent according to claim 1, wherein the structures comprise a grid-like arrangement of truncated cones or pyramids.
16. A method for installing a roof ridge vent, comprising:
    providing a continuous, elongate mat having an upper face and a lower face, and having a first portion and a second portion, the mat comprising a plurality of columns of patterned three-dimensional structures of a network of randomly convoluted polymeric filaments having a first density, at least one of the plurality of columns of patterned three-dimensional structures being provided in the first portion, and at least one other of the plurality of columns of patterned three-dimensional structures being provided in the second portion, the mat further comprising a throat portion between the first portion and a second portion, the throat portion having a network of randomly convoluted polymeric filaments wherein an entirety of the network of randomly convoluted filaments of the throat portion has a density higher than a density of the network of randomly convoluted filaments of each of the first portion and the second portion;
    providing a first cover layer covering an outer edge of the first portion and connecting the first cover layer to the outer edge of the first portion; and
    providing a second cover layer covering an outer edge of the second portion and connecting the second cover layer to the outer edge of the second portion.
17. The method according to claim 16, further comprising:
    placing the roof ridge vent over an open slot formed along a roof ridge; and
    securing the roof ridge vent to the roof ridge.

18. The method according to claim 16, wherein the placing the roof ridge vent includes bending the roof ridge vent at the throat portion of the roof ridge vent so as to be placed over the roof ridge.

* * * * *